United States Patent [19]
Ishikawa

[11] Patent Number: 5,545,960
[45] Date of Patent: Aug. 13, 1996

[54] AUTONOMOUS MOBILE MACHINE, AND SYSTEM AND METHOD FOR CONTROLLING A MOBILE MACHINE

[75] Inventor: Shigeki Ishikawa, Tokyo, Japan

[73] Assignee: International Business Machines Corporation, Armonk, N.Y.

[21] Appl. No.: 865,576

[22] Filed: Apr. 6, 1992

[30] Foreign Application Priority Data

Apr. 9, 1991 [JP] Japan .................................... 3-103463

[51] Int. Cl.⁶ .................................................. G05B 19/42
[52] U.S. Cl. ................ 318/587; 318/568.12; 364/424.02
[58] Field of Search ..................................... 318/560–646, 318/139; 364/424.02, 424.06, 426, 443; 395/80–89; 901/1, 3, 9, 12, 13, 15–20; 180/167–169

[56] References Cited

U.S. PATENT DOCUMENTS

| | | | |
|---|---|---|---|
| 4,954,962 | 9/1990 | Evans, Jr. et al. | 901/47 X |
| 5,006,988 | 4/1991 | Borenstein et al. | 318/568.16 X |
| 5,036,474 | 7/1991 | Bhanu et al. | 364/424.02 |
| 5,047,701 | 9/1991 | Takarada et al. | 318/508.1 |
| 5,081,585 | 1/1992 | Kurami et al. | 318/587 X |
| 5,087,969 | 2/1992 | Kamada et al. | 364/424.01 |
| 5,101,351 | 3/1992 | Hattori | 364/424.02 |
| 5,122,957 | 6/1992 | Hattori | 364/424.02 |
| 5,150,026 | 9/1992 | Seraji et al. | 318/508.11 |

FOREIGN PATENT DOCUMENTS

2270006  11/1990  Japan .

OTHER PUBLICATIONS

Murofushi et al., "Fuzzy Control of a Model Car", Journal of the Robotic Society of Japan, vol. 6, No. 6, pp. 536–541, Dec. 1988.

Takeuchi, "An Autonomous Fuzzy Mobile Robot", Journal of the Robotic Society of Japan, vol. & No. 6 pp. 549–556, Dec. 1988.

Maeda et al., "Collision Avoidance Control among Moving Obstacles for a Mobile Robot on the Fuzzy Reasoning", Journal of the Robotic Society of Japan, vol. 6, No. 6, pp. 518–522, 1988.

Mamdani et al., "An Experiment in Linguistic Synthesis with a Fuzzy Logic Controller", Int'l. Journal of Man–Machine Studies, vol. 7, pp. 1–13, 9 (1974).

Zadeh, "Fuzzy Sets", Information & Control, vol.8, pp. 338–358, (1965).

*Primary Examiner*—Paul Ip
*Attorney, Agent, or Firm*—Louis J. Percello

[57] ABSTRACT

The present apparatus, control system, and method for navigating is used to navigate a mobile machine accurately along a traced path so that the machine avoids collisions with obstacles. Intermediate control outputs are generated not only in accordance with a signal indicative of a distance and angle from a path to be traced according to a navigation procedure for path tracing, but also in response to a signal related to the obstacle-free space ahead of the machine according to a navigation procedure for obstacle avoidance. Weighting coefficients respective for the two procedures are generated by fuzzy inference based on signals indicating the distance and angle from the predetermined path and signals related to the obstacle-free space ahead of the machine. Final control outputs are computed in accordance with the two intermediate outputs and the two weighting coefficients. Regardless of the number of obstacles a mobile machine comes across while moving along a path, and of whether or not they are moving, the mobile machine can avoid them reliably and smoothly.

19 Claims, 15 Drawing Sheets

FIG. 10

FUZZY RULES FOR DETERMINING SPEED V

| D \ A | NB | NM | NS | ZZ | PS | PM | PB |
|-------|----|----|----|----|----|----|----|
| NB    | PS | PS | PS | ZZ | PS | PM | PB |
| NM    | PS | PS | PS | PM | PM | PB | PM |
| NS    | PS | PS | PM | PB | PS | PM | PS |
| ZZ    | PS | PS | PM | PB | PB | PM | PS |
| PS    | PS | PM | PB | PM | PM | PS | PS |
| PM    | PM | PM | PM | PM | PS | PS | PS |
| PB    | PM | PB | PM | PM | PS | PS | PS |

FUZZY RULES FOR DETERMINING STEERING ANGLE S

| D \ A | NB | NM | NS | ZZ | PS | PM | PB |
|-------|----|----|----|----|----|----|----|
| NB    | PB | NM | NS | ZZ | NS | PM | PB |
| NM    | PB | PB | PM | PM | PS | ZZ | NS |
| NS    | PB | PB | PM | PM | PS | ZZ | NS |
| ZZ    | PB | PM | PS | PS | ZZ | NS | NB |
| PS    | PB | PS | ZZ | ZZ | NS | NM | NB |
| PM    | PS | ZZ | NS | NM | NM | NB | NB |
| PB    | PS | ZZ | NS | NM | NM | NB | NB |

FIG. 12

DECISION TABLE FOR PARAMETER STATE

| | | A | | |
|---|---|---|---|---|
| | | $-5° > A$ | $-5° < A < 5°$ | $A > 5°$ |
| D | $-3cm > D$ | 1 | 1 | -1 |
| | $-3cm < D < 3cm$ | 1 | 0 | 1 |
| | $D > 3cm$ | -1 | 1 | 1 |

DECISION TABLE FOR PARAMETER STATE

| | | A | | |
|---|---|---|---|---|
| | | $-5° > A$ | $-5° < A < 5°$ | $A > 5°$ |
| D | $-3cm > D$ | -1 | -1 | -1 |
| | $-3cm < D < 3cm$ | 0 | 0 | 0 |
| | $D > 3cm$ | 1 | 1 | 1 |

FIG. 16

| | |
|---|---|
| | FIG. 16A |
| | FIG. 16B |

FIG. 16A

| RULE NO. | INPUT (*STA = STATE, SID = SIDE) | | | | | | | | | | | | OUTPUT | | | COMMENT |
|---|---|---|---|---|---|---|---|---|---|---|---|---|---|---|---|---|
| | W1 | W2 | W3 | W4 | W5 | DW1 | DW2 | DW3 | DW4 | DW5 | STA | SID | V | S | K | |
| RULE001 | - | ZZ | ZZ | - | - | - | - | - | - | - | - | - | ZZ | ZZ | PB | WHEN IT MIGHT BE IN CONTACT WITH AN OBSTACLE AHEAD OF IT |
| RULE002 | - | - | ZZ | ZZ | - | - | - | - | - | - | - | - | ZZ | ZZ | PB | |
| RULE003 | ZZ | ZZ | ZZ | ZZ | ZZ | - | - | - | - | - | - | - | ZZ | ZZ | PB | WHEN OBSTACLES EXIST TO THE RIGHT, LEFT AND AHEAD OF IT |
| RULE004 | PS | ZZ | ZZ | ZZ | ZZ | - | - | - | - | - | - | - | ZZ | ZZ | PB | |
| RULE005 | ZZ | PS | ZZ | ZZ | ZZ | - | - | - | - | - | - | - | ZZ | ZZ | PB | |
| RULE006 | ZZ | ZZ | ZZ | PS | ZZ | - | - | - | - | - | - | - | ZZ | ZZ | PB | |
| RULE007 | ZZ | ZZ | ZZ | ZZ | PS | - | - | - | - | - | - | - | ZZ | ZZ | PB | |
| RULE008 | PS | PS | ZZ | ZZ | ZZ | - | - | - | - | - | - | - | ZZ | ZZ | PB | |
| RULE009 | ZZ | PS | PS | ZZ | ZZ | - | - | - | - | - | - | - | ZZ | ZZ | PB | |
| RULE010 | ZZ | ZZ | PS | PS | ZZ | - | - | - | - | - | - | - | ZZ | ZZ | PB | |
| RULE011 | ZZ | ZZ | ZZ | PS | PS | - | - | - | - | - | - | - | ZZ | ZZ | PB | |
| RULE012 | PB | PB | PM | ZZ | ZZ | - | - | - | - | - | - | - | PM | NM | PS | RULES FOR STEERING TOWARD A FREE SPACE |
| RULE013 | PB | PB | PM | PS | ZZ | - | - | - | - | - | - | - | PM | NM | PS | |
| RULE014 | PB | PB | PM | ZZ | PS | - | - | - | - | - | - | - | PM | NM | PS | |
| RULE015 | PB | PM | PS | ZZ | ZZ | - | - | - | - | - | - | - | PS | NB | PM | |
| RULE016 | PB | PM | PS | PS | ZZ | - | - | - | - | - | - | - | PS | NB | PM | |
| RULE017 | PB | PM | PS | ZZ | PS | - | - | - | - | - | - | - | PS | NB | PM | |
| RULE018 | PB | PS | ZZ | ZZ | ZZ | - | - | - | - | - | - | - | PS | NB | PB | |
| RULE019 | PB | PS | ZZ | PS | ZZ | - | - | - | - | - | - | - | PS | NB | PB | |
| RULE020 | PB | PS | ZZ | ZZ | PS | - | - | - | - | - | - | - | PS | NB | PB | |
| RULE021 | ZZ | ZZ | PM | PB | PB | - | - | - | - | - | - | - | PM | PM | PS | |
| RULE022 | ZZ | PS | PM | PB | PB | - | - | - | - | - | - | - | PM | PM | PS | |
| RULE023 | PS | ZZ | PM | PB | PB | - | - | - | - | - | - | - | PM | PM | PS | |
| RULE024 | ZZ | ZZ | PS | PM | PB | - | - | - | - | - | - | - | PS | PB | PM | |
| RULE025 | ZZ | PS | PS | PM | PB | - | - | - | - | - | - | - | PS | PB | PM | |
| RULE026 | PS | ZZ | PS | PM | PB | - | - | - | - | - | - | - | PS | PB | PM | |
| RULE027 | ZZ | ZZ | ZZ | PS | PB | - | - | - | - | - | - | - | PS | PB | PB | |
| RULE028 | ZZ | PS | ZZ | PS | PB | - | - | - | - | - | - | - | PS | PB | PB | |
| RULE029 | PS | ZZ | ZZ | PS | PB | - | - | - | - | - | - | - | PS | PB | PB | |

| | | | | | | | | | | | | | | | | |
|---|---|---|---|---|---|---|---|---|---|---|---|---|---|---|---|---|
| RULE030 | ZZ | ZZ | PM | ZZ | ZZ | - | - | - | - | - | - | - | PS | ZZ | PM | RULES FOR |
| RULE031 | ZZ | PS | PM | PS | ZZ | - | - | - | - | - | - | - | PS | ZZ | PM | STEERING |
| RULE032 | ZZ | PS | PM | ZZ | ZZ | - | - | - | - | - | - | - | PS | NS | PM | TOWARD A |
| RULE033 | ZZ | ZZ | PM | PS | ZZ | - | - | - | - | - | - | - | PS | PS | PM | FREE SPACE |
| RULE034 | PS | PM | PS | PS | ZZ | - | - | - | - | - | - | - | PS | NB | PM | TO PASS |
| RULE035 | PS | PM | PS | ZZ | ZZ | - | - | - | - | - | - | - | PS | NB | PM | THROUGH A |
| RULE036 | PS | PB | PM | ZZ | ZZ | - | - | - | - | - | - | - | PS | NM | PM | NARROW CRANK |
| RULE037 | PM | PB | PM | PS | ZZ | - | - | - | - | - | - | - | PM | NM | PS | COURSE |
| RULE038 | PM | PB | PM | ZZ | PS | - | - | - | - | - | - | - | PM | NM | PS | |
| RULE039 | PM | PB | PM | ZZ | ZZ | - | - | - | - | - | - | - | PS | NM | PM | |
| RULE040 | PM | PM | PS | ZZ | ZZ | - | - | - | - | - | - | - | PS | NB | PM | |
| RULE041 | PM | PM | PS | PS | ZZ | - | - | - | - | - | - | - | PS | NB | PM | |
| RULE042 | PM | PM | PS | ZZ | PS | - | - | - | - | - | - | - | PS | NB | PM | |
| RULE043 | PM | PS | ZZ | ZZ | ZZ | - | - | - | - | - | - | - | PS | NB | PB | |
| RULE044 | PM | PS | ZZ | PS | ZZ | - | - | - | - | - | - | - | PS | NB | PB | |
| RULE045 | PM | PS | ZZ | ZZ | PS | - | - | - | - | - | - | - | PS | NB | PB | |
| RULE046 | ZZ | PS | PS | PM | PS | - | - | - | - | - | - | - | PS | PM | PM | |
| RULE047 | ZZ | ZZ | PS | PM | PS | - | - | - | - | - | - | - | PS | PM | PM | |
| RULE048 | ZZ | ZZ | PS | PM | PM | - | - | - | - | - | - | - | PS | PM | PM | |
| RULE049 | ZZ | PS | PS | PM | PM | - | - | - | - | - | - | - | PS | PB | PM | |
| RULE050 | PS | ZZ | PS | PM | PM | - | - | - | - | - | - | - | PS | PB | PM | |
| RULE051 | ZZ | ZZ | PM | PB | PM | - | - | - | - | - | - | - | PM | PM | PS | |
| RULE052 | ZZ | PS | PM | PB | PM | - | - | - | - | - | - | - | PM | PM | PS | |
| RULE053 | PS | ZZ | PM | PB | PM | - | - | - | - | - | - | - | PM | PM | PS | |
| RULE054 | ZZ | ZZ | PM | PB | PS | - | - | - | - | - | - | - | PS | PM | PM | |
| RULE055 | ZZ | ZZ | ZZ | PS | PM | - | - | - | - | - | - | - | PS | PB | PB | |
| RULE056 | ZZ | PS | ZZ | PS | PM | - | - | - | - | - | - | - | PS | PB | PB | |
| RULE057 | PS | ZZ | ZZ | PS | PM | - | - | - | - | - | - | - | PS | PB | PB | |
| RULE058 | PB | PB | PB | PM | PS | ZZ | ZZ | ZZ | ZZ | ZZ | ZZ | - | PB | ZZ | ZZ | WHEN IT RUNS |
| RULE059 | PB | PB | PB | PM | ZZ | ZZ | ZZ | ZZ | ZZ | ZZ | ZZ | - | PB | NS | ZZ | STRAIGHT |
| RULE060 | PB | PB | PB | PS | PS | ZZ | ZZ | ZZ | ZZ | ZZ | ZZ | - | PB | ZZ | ZZ | ALONGSIDE A |
| RULE061 | PB | PB | PB | PS | ZZ | ZZ | ZZ | ZZ | ZZ | ZZ | ZZ | - | PB | NS | ZZ | WALL ON THE |
| RULE062 | PB | PB | PM | PM | PS | ZZ | ZZ | ZZ | ZZ | ZZ | ZZ | - | PB | ZZ | ZZ | RIGHT |
| RULE063 | PB | PB | PM | PM | ZZ | ZZ | ZZ | ZZ | ZZ | ZZ | ZZ | - | PB | NS | ZZ | (ON-LINE) |
| RULE064 | PB | PB | PM | PS | PS | ZZ | ZZ | ZZ | ZZ | ZZ | ZZ | - | PB | ZZ | ZZ | |
| RULE065 | PB | PB | PM | PS | ZZ | ZZ | ZZ | ZZ | ZZ | ZZ | ZZ | - | PB | NS | ZZ | |

*('-' : DON'T CARE)

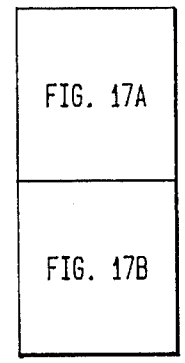

FIG. 17A

| RULE NO. | INPUT (*STA = STATE, SID = SIDE) | | | | | | | | | | | | OUTPUT | | | COMMENT |
|---|---|---|---|---|---|---|---|---|---|---|---|---|---|---|---|---|
| | W1 | W2 | W3 | W4 | W5 | DW1 | DW2 | DW3 | DW4 | DW5 | STA | SID | V | S | K | |
| RULE066 | PS | PM | PB | PB | PB | ZZ | ZZ | ZZ | ZZ | ZZ | ZZ | – | PB | ZZ | ZZ | WHEN IT |
| RULE067 | ZZ | PM | PB | PB | PB | ZZ | ZZ | ZZ | ZZ | ZZ | ZZ | – | PB | PS | ZZ | MOVES |
| RULE068 | PS | PS | PB | PB | PB | ZZ | ZZ | ZZ | ZZ | ZZ | ZZ | – | PB | ZZ | ZZ | STRAIGHT |
| RULE069 | ZZ | PS | PB | PB | PB | ZZ | ZZ | ZZ | ZZ | ZZ | ZZ | – | PB | PS | ZZ | ALONGSIDE A |
| RULE070 | PS | PM | PM | PB | PB | ZZ | ZZ | ZZ | ZZ | ZZ | ZZ | – | PB | ZZ | ZZ | WALL ON THE |
| RULE071 | ZZ | PM | PM | PB | PB | ZZ | ZZ | ZZ | ZZ | ZZ | ZZ | – | PB | PS | ZZ | LEFT |
| RULE072 | PS | PS | PM | PB | PB | ZZ | ZZ | ZZ | ZZ | ZZ | ZZ | – | PB | ZZ | ZZ | (ON-LINE) |
| RULE073 | ZZ | PS | PM | PB | PB | ZZ | ZZ | ZZ | ZZ | ZZ | ZZ | – | PB | PS | ZZ | |
| RULE074 | PS | PM | PB | PM | PS | ZZ | ZZ | ZZ | ZZ | ZZ | PB | – | PM | ZZ | PM | WHEN IT |
| RULE075 | PS | PS | PB | PS | PS | ZZ | ZZ | ZZ | ZZ | ZZ | PB | – | PM | ZZ | PM | MOVES |
| RULE076 | PS | PM | PB | PS | PS | ZZ | ZZ | ZZ | ZZ | ZZ | PB | – | PM | NS | PM | STRAIGHT |
| RULE077 | PS | PS | PB | PM | PS | ZZ | ZZ | ZZ | ZZ | ZZ | PB | – | PM | PS | PM | DOWN THE |
| RULE078 | PS | PM | PB | PM | PS | ZZ | ZZ | ZZ | ZZ | ZZ | NB | – | PM | ZZ | PM | CENTER OF |
| RULE079 | PS | PS | PB | PS | PS | ZZ | ZZ | ZZ | ZZ | ZZ | NB | – | PM | ZZ | PM | A RELATIVELY |
| RULE080 | PS | PM | PB | PS | PS | ZZ | ZZ | ZZ | ZZ | ZZ | NB | – | PM | NS | PM | NARROW PATH |
| RULE081 | PS | PS | PB | PM | PS | ZZ | ZZ | ZZ | ZZ | ZZ | NB | – | PM | PS | PM | (OFF-LINE) |
| RULE082 | PB | PB | PB | PM | PS | ZZ | ZZ | NM | ZZ | ZZ | – | – | PM | NS | PM | WHEN AN OBSTACLE |
| RULE083 | PB | PB | PB | PS | PS | ZZ | ZZ | NM | ZZ | ZZ | – | – | PM | NS | PM | LARGER THAN |
| RULE084 | PB | PB | PB | PS | ZZ | ZZ | ZZ | NM | ZZ | ZZ | – | – | PM | NM | PM | THE VEHICLE |
| RULE085 | PB | PB | PM | PM | PS | ZZ | ZZ | NM | ZZ | ZZ | – | – | PM | NM | PM | ITSELF |
| RULE086 | PB | PB | PM | PS | PS | ZZ | ZZ | NM | ZZ | ZZ | – | – | PM | NM | PM | EXISTS AHEAD |
| RULE087 | PB | PB | PM | PS | ZZ | ZZ | ZZ | NM | ZZ | ZZ | – | – | PM | NM | PM | OF IT AS IT |
| RULE088 | PB | PB | PB | PM | PS | ZZ | ZZ | NM | NS | ZZ | – | – | PM | NS | PM | MOVES |
| RULE089 | PB | PB | PB | PS | PS | ZZ | ZZ | NM | NS | ZZ | – | – | PM | NS | PM | STRAIGHT |
| RULE090 | PB | PB | PB | PS | ZZ | ZZ | ZZ | NM | NS | ZZ | – | – | PM | NM | PM | ALONGSIDE A |
| RULE091 | PB | PB | PM | PM | PS | ZZ | ZZ | NM | NS | ZZ | – | – | PM | NM | PM | WALL ON THE |
| RULE092 | PB | PB | PM | PS | PS | ZZ | ZZ | NM | NS | ZZ | – | – | PM | NM | PM | RIGHT |
| RULE093 | PB | PB | PM | PS | ZZ | ZZ | ZZ | NM | NS | ZZ | – | – | PM | NM | PM | (STILL FAR) |

| Rule | C1 | C2 | C3 | C4 | C5 | C6 | C7 | C8 | C9 | C10 | C11 | C12 | O1 | O2 | O3 | Description |
|---|---|---|---|---|---|---|---|---|---|---|---|---|---|---|---|---|
| RULE094 | PB | PB | PM | PM | PS | - | - | - | - | - | PB | - | PM | NM | PM | WHEN AN OBSTACLE LARGER THAN THE VEHICLE ITSELF EXISTS AHEAD OF IT AS IT MOVES STRAIGHT ALONGSIDE A WALL ON THE RIGHT (NEAR) |
| RULE095 | PB | PB | PM | PM | PM | - | - | - | - | - | PB | - | PM | NM | PM | |
| RULE096 | PB | PB | PM | PM | PS | - | - | - | - | - | NB | - | PM | NM | PM | |
| RULE097 | PB | PB | PM | PM | PM | - | - | - | - | - | NB | - | PM | NM | PM | |
| RULE098 | PB | PB | PB | PS | PM | - | - | - | NS | NS | PB | - | PM | NS | PM | WHEN IT APPROACHES AN OBSTACLE WHILE MOVING STRAIGHT ALONGSIDE A WALL ON THE RIGHT (NEAR) |
| RULE099 | PB | PB | PB | PS | PM | - | - | - | NS | NS | NB | - | PM | NS | PM | |
| RULE100 | PB | PB | PB | PS | PM | - | - | - | NB | NM | PB | - | PM | NS | PM | |
| RULE101 | PB | PB | PB | PS | PM | - | - | - | NB | NM | NB | - | PM | NS | PM | |
| RULE102 | PB | PB | PB | ZZ | PM | - | - | - | NB | NM | PB | - | PM | NM | PM | |
| RULE103 | PB | PB | PB | ZZ | PM | - | - | - | NB | NM | NB | - | PM | NM | PM | |
| RULE104 | PB | PB | PB | ZZ | PS | - | - | - | NB | NB | PB | - | PM | NM | PM | |
| RULE105 | PB | PB | PB | ZZ | PS | - | - | - | NB | NB | NB | - | PM | NM | PM | |
| RULE106 | PS | PM | PB | PB | PB | ZZ | ZZ | NM | ZZ | ZZ | - | - | PM | PS | PM | WHEN AN OBSTACLE LARGER THAN THE VEHICLE ITSELF EXISTS AHEAD OF IT AS IT MOVES STRAIGHT ALONGSIDE A WALL ON THE RIGHT (STILL FAR) |
| RULE107 | PS | PS | PB | PB | PB | ZZ | ZZ | NM | ZZ | ZZ | - | - | PM | PS | PM | |
| RULE108 | ZZ | PS | PB | PB | PB | ZZ | ZZ | NM | ZZ | ZZ | - | - | PM | PM | PM | |
| RULE109 | PS | PM | PM | PB | PB | ZZ | ZZ | NM | ZZ | ZZ | - | - | PM | PM | PM | |
| RULE110 | PS | PS | PM | PB | PB | ZZ | ZZ | NM | ZZ | ZZ | - | - | PM | PM | PM | |
| RULE111 | ZZ | PS | PM | PB | PB | ZZ | ZZ | NM | ZZ | ZZ | - | - | PM | PS | PM | |
| RULE112 | PS | PM | PB | PB | PB | ZZ | NS | NM | ZZ | ZZ | - | - | PM | PS | PM | |
| RULE113 | PS | PS | PB | PB | PB | ZZ | NS | NM | ZZ | ZZ | - | - | PM | PS | PM | |
| RULE114 | ZZ | PS | PB | PB | PB | ZZ | NS | NM | ZZ | ZZ | - | - | PM | PM | PM | |
| RULE115 | PS | PM | PM | PB | PB | ZZ | NS | NM | ZZ | ZZ | - | - | PM | PM | PM | |
| RULE116 | PS | PS | PM | PB | PB | ZZ | NS | NM | ZZ | ZZ | - | - | PM | PM | PM | |
| RULE117 | ZZ | PS | PM | PB | PB | ZZ | NS | NM | ZZ | ZZ | - | - | PM | PM | PM | |

*('-' : DON'T CARE)

| RULE NO. | INPUT (*STA = STATE, SID = SIDE) |||||||||||| OUTPUT ||| COMMENT |
|---|---|---|---|---|---|---|---|---|---|---|---|---|---|---|---|---|
| | W1 | W2 | W3 | W4 | W5 | DW1 | DW2 | DW3 | DW4 | DW5 | STA | SID | V | S | K | |
| RULE118 | PS | PM | PM | PB | PB | - | - | - | - | - | PB | - | PM | PM | PM | WHEN AN OBSTACLE LARGER THAN THE VEHICLE ITSELF EXISTS AHEAD OF IT AS IT MOVES STRAIGHT ALONGSIDE A WALL ON THE RIGHT (NEAR) |
| RULE119 | PM | PM | PM | PB | PB | - | - | - | - | - | PB | - | PM | PM | PM | |
| RULE120 | PS | PM | PM | PB | PB | - | - | - | - | - | NB | - | PM | PM | PM | |
| RULE121 | PM | PM | PM | PB | PB | - | - | - | - | - | NB | - | PM | PM | PM | |
| RULE122 | PM | PS | PB | PB | PB | NS | NS | - | - | - | PB | - | PM | PS | PM | WHEN IT APPROACHES AN OBSTACLE WHILE MOVING STRAIGHT ALONGSIDE A WALL ON THE LEFT (NEAR) |
| RULE123 | PM | PS | PB | PB | PB | NS | NS | - | - | - | NB | - | PM | PS | PM | |
| RULE124 | PM | PS | PB | PB | PB | NM | NB | - | - | - | PB | - | PM | PS | PM | |
| RULE125 | PM | PS | PB | PB | PB | NM | NB | - | - | - | NB | - | PM | PS | PM | |
| RULE126 | PM | ZZ | PB | PB | PB | NM | NB | - | - | - | PB | - | PM | PM | PM | |
| RULE127 | PM | ZZ | PB | PB | PB | NM | NB | - | - | - | NB | - | PM | PM | PM | |
| RULE128 | PS | ZZ | PB | PB | PB | NB | NB | - | - | - | PB | - | PM | PM | PM | |
| RULE129 | PS | ZZ | PB | PB | PB | NB | NB | - | - | - | NB | - | PM | PM | PM | |
| RULE130 | ZZ | - | - | - | - | ZZ | - | - | - | - | PB | - | PM | ZZ | PB | WHEN IT MOVES PAST AN OBSTACLE ON THE LEFT |
| RULE131 | ZZ | - | - | - | - | NS | - | - | - | - | PB | - | PM | PS | PB | |
| RULE132 | ZZ | - | - | - | - | PS | - | - | - | - | PB | - | PM | NS | PB | |
| RULE133 | ZZ | ZZ | - | - | - | ZZ | ZZ | - | - | - | PB | - | PM | PS | PB | |
| RULE134 | ZZ | ZZ | - | - | - | PS | PS | - | - | - | PB | - | PS | ZZ | PB | |
| RULE135 | ZZ | ZZ | - | - | - | PS | PM | - | - | - | PB | - | PS | ZZ | PB | |
| RULE136 | ZZ | PS | - | - | - | ZZ | ZZ | - | - | - | PB | - | PM | ZZ | PB | |
| RULE137 | ZZ | PS | - | - | - | ZZ | PS | - | - | - | PB | - | PM | NS | PB | |
| RULE138 | ZZ | PS | - | - | - | PS | PM | - | - | - | PB | - | PM | NS | PB | |
| RULE139 | PS | PS | - | - | - | NM | NM | - | - | - | PB | - | PS | PM | PB | |
| RULE140 | PS | PS | - | - | - | NS | NS | - | - | - | PB | - | PM | PS | PB | |
| RULE141 | PS | PS | - | - | - | ZZ | ZZ | - | - | - | PB | - | PM | ZZ | PB | |
| RULE142 | PS | PS | - | - | - | PS | PM | - | - | - | PB | - | PM | NS | PB | |
| RULE143 | - | - | - | - | ZZ | - | - | - | ZZ | - | NB | - | PM | ZZ | PB | WHEN IT MOVES ALONGSIDE A WALL ON THE RIGHT |
| RULE144 | - | - | - | - | ZZ | - | - | - | NS | - | NB | - | PM | NS | PB | |
| RULE145 | - | - | - | - | ZZ | - | - | - | PS | - | NB | - | PM | PS | PB | |
| RULE146 | - | - | - | ZZ | ZZ | - | - | - | ZZ | ZZ | NB | - | PM | PS | PB | |
| RULE147 | - | - | - | ZZ | ZZ | - | - | - | PS | PS | NB | - | PS | ZZ | PB | |
| RULE148 | - | - | - | ZZ | ZZ | - | - | - | PM | PS | NB | - | PS | ZZ | PB | |
| RULE149 | - | - | - | PS | ZZ | - | - | - | ZZ | ZZ | NB | - | PM | ZZ | PB | |
| RULE150 | - | - | - | PS | ZZ | - | - | - | PS | ZZ | NB | - | PM | PS | PB | |
| RULE151 | - | - | - | PS | ZZ | - | - | - | PM | PS | NB | - | PM | PS | PB | |
| RULE152 | - | - | - | PS | PS | - | - | - | NM | NM | NB | - | PS | NM | PB | |
| RULE153 | - | - | - | PS | PS | - | - | - | NS | NS | NB | - | PM | NS | PB | |
| RULE154 | - | - | - | PS | PS | - | - | - | ZZ | ZZ | NB | - | PM | ZZ | PB | |
| RULE155 | - | - | - | PS | PS | - | - | - | PM | PS | NB | - | PM | PS | PB | |

*('-' : DON'T CARE)

AUTONOMOUS MOBILE MACHINE, AND SYSTEM AND METHOD FOR CONTROLLING A MOBILE MACHINE

BACKGROUND OF THE INVENTION

1. Field of the Invention

This invention relates to an autonomous mobile machine such as a robot or car, as well as a control system and method for navigating a mobile machine to accurately move along a path to be traced while avoiding collisions with obstacles existing around it.

2. Description of Prior Art

This invention employs fuzzy control for navigating mobile machines. Two representative papers on fuzzy control are listed below:

Lofti A. Zadeh, "Fuzzy sets," Information & Control, vol. 8, pp. 338–358, (1965); and E. H. Mamdani & S. Assilian, "An Experiment in Linguistic Synthesis with a Fuzzy Logic Controller," International Journal of Man-Machine Studies, vol. 7, pp. 1–13 (1974).

Mobile machine navigation is generally categorized into a control procedure for tracing a planned path (path tracing navigation) and a control procedure for avoiding collisions with environmental obstacles (obstacle avoidance navigation). The various schemes for realizing these procedures by using fuzzy control to navigate mobile machines include the following:

(1) Murofushi and Sugano, "Fuzzy Control of a Model Car," Journal of the Robotic Society of Japan, Vol. 6, No. 6, pp. 536–541, Dec. 1988. In order to describe macro actions such as straight movement, right turn, and movement into a garage space, the authors attempt to employ fuzzy control for a certain part of judgement on the status of the vehicle, by measuring distances from walls and the directions of the car itself. They also use fuzzy control for tracing wall surfaces defining the path. (2) Takeuchi, "An Autonomous Fuzzy Mobile Robot," Journal of the Robotic Society of Japan, Vol. &, No. 6, pp. 549–556, Dec. 1988. The author presents a fuzzy control system that receives as inputs the direction of motion P, the path width W, and left and right wheel revolutions, Rl and Rr, obtained through a visual system; and issues as outputs instruction on the speeds of the left and right wheels, Ul and Ur. This system employs a fuzzy system separately for control of direction and of speed increases and decreases. This approach adopts the hallway-following method and avoidance of collisions with stationary obstacles not as wide as the vehicle. (3) Maeda and Takegaki, "Collision Avoidance Control among Moving Obstacles for a Mobile Robot on the Fuzzy Reasoning," Journal of the Robotic Society of Japan, Vol. 6, No. 6, pp. 518–522, 1988. The authors propose a method of avoiding collisions with a single moving obstacle by representing the moving obstacle as a set of points. This approach defines a parameter called "danger of collision," and uses fuzzy control to compute this parameter.

However, these conventional schemes using fuzzy control to navigate a mobile robot have difficulty in coping with a real environment, because a supposed input model may not be actually obtained on account of the limitations of sensor processing, or may lack generality.

Of these schemes, the first is explained as using fuzzy control to judge a situation; however, it uses a threshold value as the final criterion for the judgement, which means that, strictly speaking, it does not use fuzzy control. Specifically, it merely employs partially fuzzy computation to determine the judgement parameters, and the computation is substantially the same linear conversion as in the conventional method. Additionally, this approach does not handle avoidance of collisions with obstacles other than a wall defining the path, and its functions for navigating a mobile robot are therefore insufficient.

In the second scheme, path tracing and obstacle avoidance functions are realized on the basis of the direction of motion P and the path width W with regard to direction control; however, because the supposed path is a hallway, it may not be possible to determine the direction of motion P when the free space is too large. In addition, since the scheme relies on measurement of the direction of motion and the path width by using a visual system, if the lighting is insufficient in the actual environment, necessary parameters cannot be obtained, or even if they are obtained, their accuracies may be low. Further, the need for image processing causes a problem with respect to the response speed.

A common feature of the first two approaches is that the path is defined by obstacles in the form of walls and that path tracing is realized by following the walls. In order to realize such a high level of navigation that the vehicle avoids unexpected obstacles while moving along a path in a free space that has been taught off-line beforehand, path-tracing navigation and obstacle-avoidance navigation must be designed independently.

The third approach is limited to the case in which only one moving obstacle exists, and it attempts to realize obstacle avoidance by using a fuzzy rule that depends on the moving obstacle. Therefore, it cannot operate in an environment where a plurality of stationary obstacles and a moving obstacles exist. Further, although this approach is based on the premise that the position and the relative speed of the supposed moving obstacle are known, the actual moving environment is not simple, and its applicability is therefore limited. It is difficult to obtain such information in a real environment.

There is another known control procedure that designs path-tracing navigation and obstacle-avoiding navigation independently and, while normally navigating a mobile machine to follow a path, switches to obstacle—avoiding navigation in accordance with the status of motion of the mobile machine. However, the reliability of the machine's movements is not ensured because the machine might be suddenly slowed down, or its steering might be abruptly changed.

JA PUPA 2-270006 aims to solve the problem and discloses an autonomous running vehicle that comprises means for obtaining an image of path conditions including a guide line making the path and obstacles, means for permitting a vehicle to run autonomously along the guide line by fuzzy control in response to the image signal, means for discriminating an obstacle in accordance with the image signal, means for setting around the discriminated obstacle a virtual guide line continuously connected to the normal guide line so that the vehicle can move while avoiding the obstacle, and means for permitting the vehicle to run autonomously by fuzzy control along the virtual guide line instead of the normal guide line. This approach involves the following problems:

The first problem is the same as that of the above mentioned second approach in that it needs a visual system. Another problem is that the vehicle avoids the obstacle by tracing the modified path, and no specific control procedure for obstacle avoidance apart from path-tracing navigation has been devised. Therefore, even though it may cope with an obstacle in the form of a point, it cannot deal with moving obstacles or stationary obstacles having a substantial depth.

OBJECTIVES OF THE INVENTION

An objective of this invention is to provide an autonomous mobile machine that can cope with any general environment without relying on a special environment, as well as a system and method for controlling the mobile machine.

Another objective of the invention is to provide an autonomous mobile machine that can move smoothly while reliably avoiding obstacles, as well as a system and method for controlling the mobile machine.

Another objective of the invention is to provide an improved control system using fuzzy inference.

SUMMARY OF THE INVENTION

This invention makes it possible for a mobile machine to avoid obstacles reliably and smoothly, regardless of the number of obstacles that the mobile machine comes across while tracing the path, and of whether or not they are moving.

Since the information required for path tracing navigation and that required for obstacle avoidance navigation are different, the invention proposes a mobile machine navigation system that computes intermediate control outputs for them independently, and then combines the outputs by using fuzzy inference to obtain final control outputs.

Intermediate control outputs are generated not only in response to a signal indicative of the distance and angle from a path to be traced according to the navigation procedure for path tracing, but also in response to a signal related to the space in which a machine can move, according to the navigation procedure for obstacle avoidance. By fuzzy inference based on the signal indicative of the distance and angle from the predetermined path and the signal related to the space in which the machine can move, weighting coefficients are generated for the two procedures. Final control outputs are computed on the basis of the two intermediate outputs and the two weighting coefficients.

BRIEF DESCRIPTION OF THE DRAWINGS

FIG. 10 is a diagram showing the fuzzy rules for path tracing navigation.

FIG. 12 is a diagram showing the procedure for determining the parameters STATE and SIDE.

FIG. 16, comprising FIGS. 16A and 16B, is a diagram showing the fuzzy rules for obstacle avoidance navigation and determination of the weighting coefficients.

FIGS. 17, comprising FIGS. 17A and 17B, is a diagram showing the fuzzy rules for obstacle avoidance navigation and determination of the weighting coefficients.

FIG. 18 is a diagram showing the fuzzy rules for obstacle avoidance navigation and determination of the weighting coefficients.

DETAILED DESCRIPTION OF THE INVENTION

Figure 1:
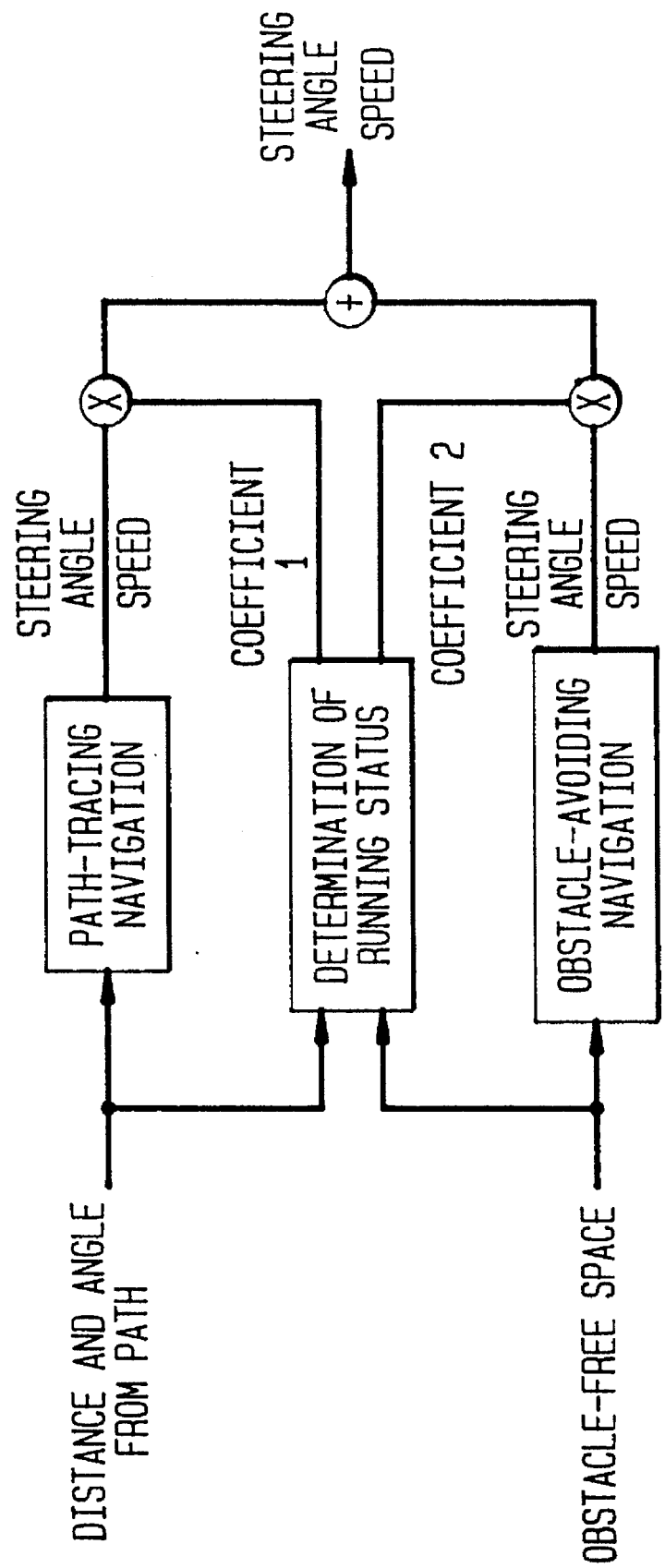
FIG. 1 is a diagram showing a general view of the control procedure according to the invention.
Figure 2:
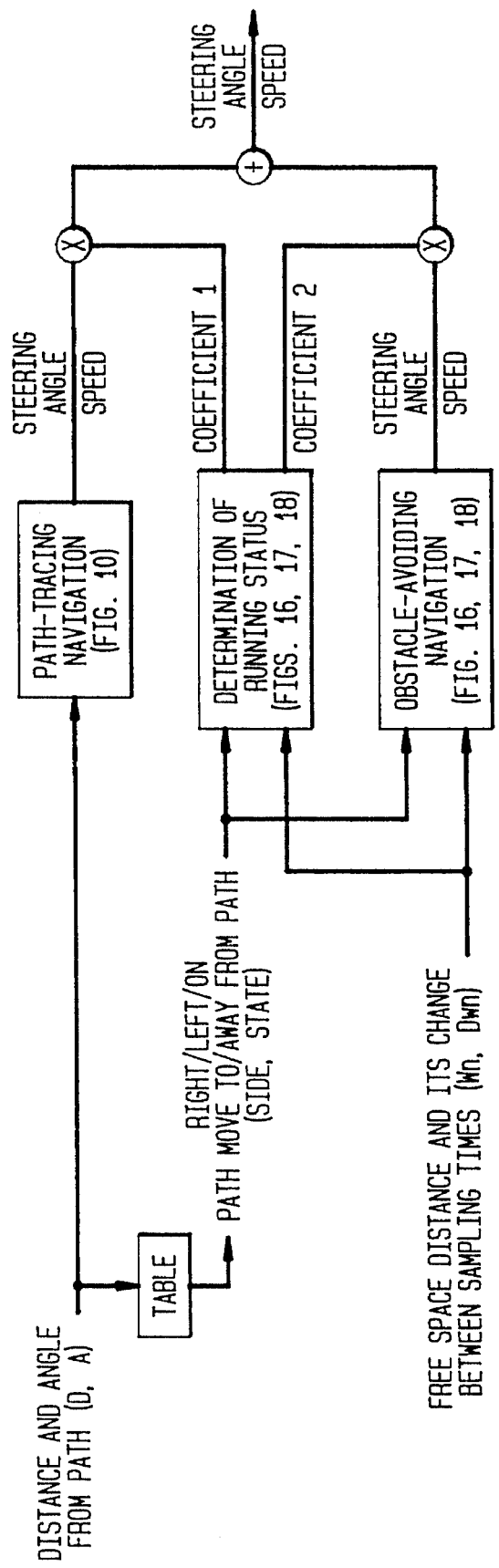
FIG. 2 is a diagram showing a general view of the control procedure embodying the invention.
Figure 3:
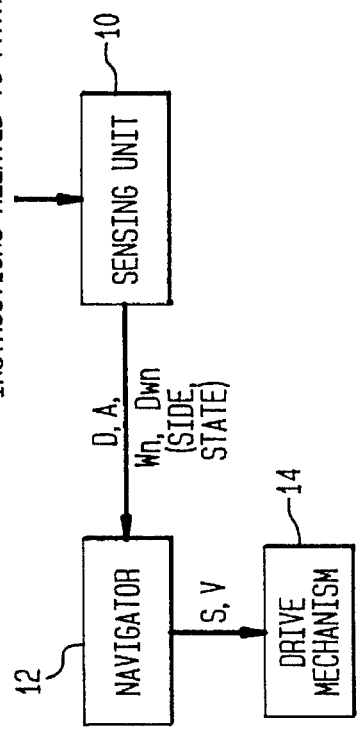
FIG. 3 is a diagram showing the system structure of the embodiment.

The invention is described below with reference to an example that navigates a robot with wheels. FIG. 2 is a diagram corresponding to FIG. 1 and shows a general view of a mobile robot control procedure according to the invention. FIG. 3 is a structural diagram of a control system provided in an autonomous mobile robot. A sensing unit 10 issues a signal indicative of the distance and angle from a planned path, more specifically, a signal indicative of the distance D of the robot from the path and the displacement angle defined by the path direction and the robot's direction of motion. The sensing unit 10 also issues a signal related to the space in which the robot can move, more specifically, a signal $D_{wn}$ indicative of the distance (depth) $W_n$ of a free space in which the robot can move and the change in this distance between sampling times. A navigator 12 receives these signals and generates control outputs for a drive mechanism 14. The control outputs consist of a signal indicating the speed V of the robot and a signal indicating the steering angle S.

In this embodiment, a SIDE signal and a STATE signal are generated from the signal indicative of the distance and angle from the path, and are used to determine the control outputs. The SIDE signal and the STATE signal may be generated by the sensing unit 10 or the navigator 12. They will be explained later in greater detail.

Figure 4:
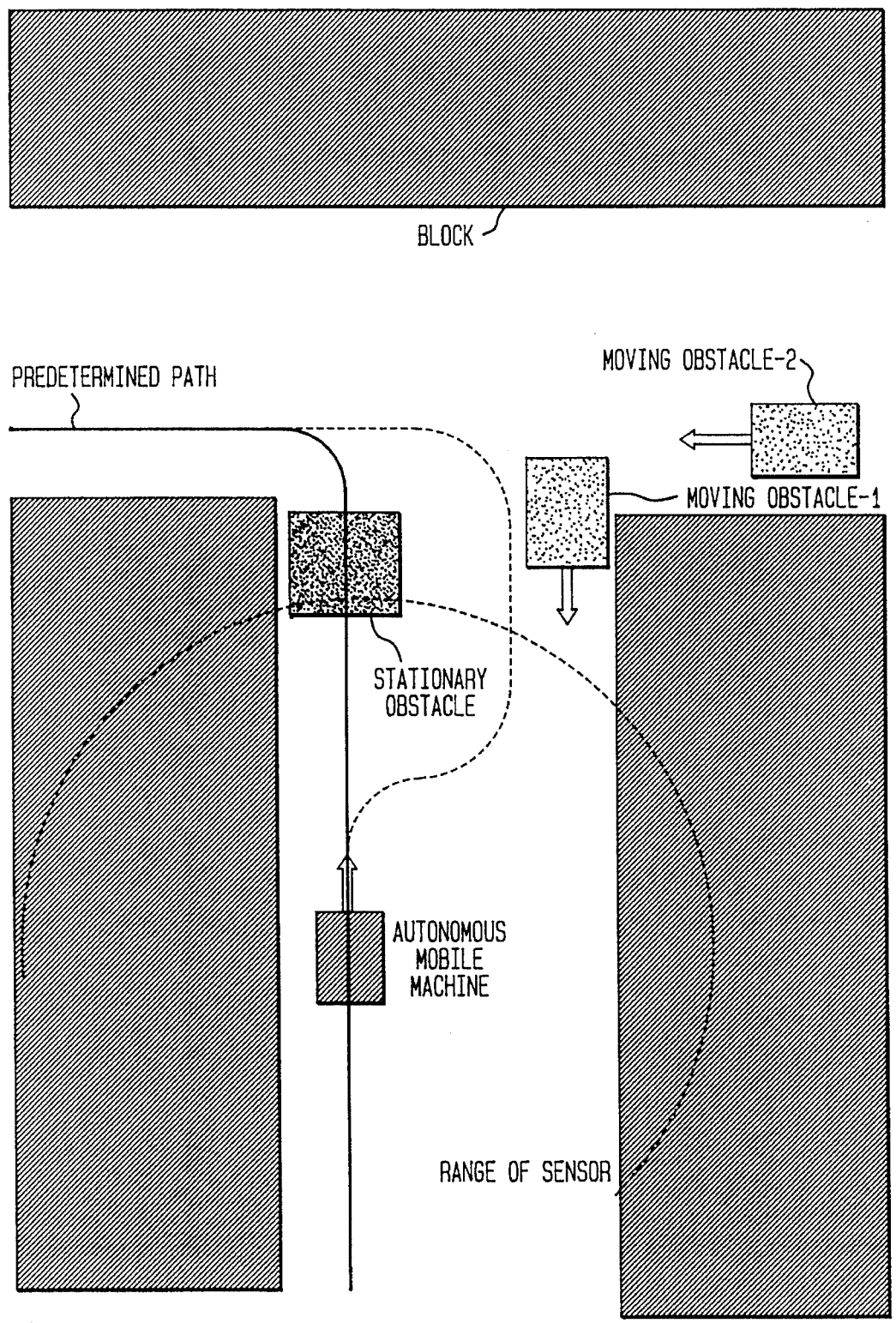
FIG. 4 is a diagram showing a supposed environment of the invention.

In the embodiment described below, the path planning is processed by a planner before the robot moves and the predetermined path is given to the sensing unit 10. Let the path information be given in the form of a segment list giving nodal coordinates. Curves are approximated as straight lines. When a path to a destination is given, the navigator 12 gives an instruction to a drive system in response to this information, while monitoring the status of motion and environment for movement, and navigates the robot to the destination. FIG. 4 shows the embodiment's supposed environment for movement.

A. Fuzzy Control for Path Tracing

Figure 5:
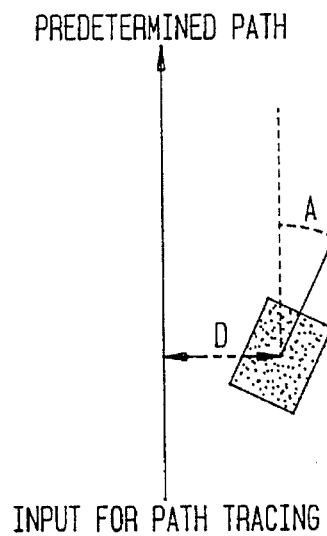
FIG. 5 is a diagram showing the inputs for path tracing navigation.

Navigation control for tracing a path given by the planner in the form of a segment list may be readily realized by conventional numerical tracing control; however, the embodiment performs path tracing control by the following method of fuzzy control. The input parameters of the fuzzy control for path tracing are the distance D from the robot to the path and the displacement angle A defined by the path direction and the vehicle's direction of motion, as shown in FIG. 5. It has been taken into consideration that this information can be obtained practically and in real time by a sensor mounted on the mobile robot. Specifically, the absolute position/direction of the vehicle itself is measured by a method using information on the rotation of wheels (dead reckoning), as described by Watanabe and Yuta in "Error in Positional Data in a Dead Reckoning System for a Wheel-Type Mobile Robot, " Preliminary Papers for the Sixth Academic Lecture of the Robotic Society of Japan, pp. 347–350, Dec. 1988. The measurement gives as parameters the distance D from the robot to the path and the displacement angle A defined by the path direction and the robot's direction of motion.

The control outputs are a speed of motion V and a steering angle S. D is referred to as being negative when the robot is located to the left of the path, and positive when it is to the right. A is referred to as being negative when the direction of motion of the mobile robot is angled counterclockwise from the path direction, and being positive when it is angled clockwise. Similarly, S is referred to as being negative for a counterclockwise angle, and positive for a clockwise angle.

Figure 6:
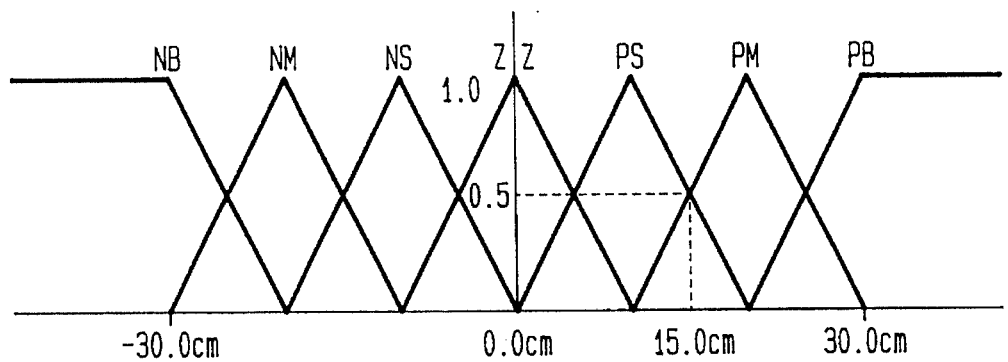
FIG. 6 is a diagram showing the membership functions of the distance D of an autonomous mobile machine from a planned path.
Figure 7:
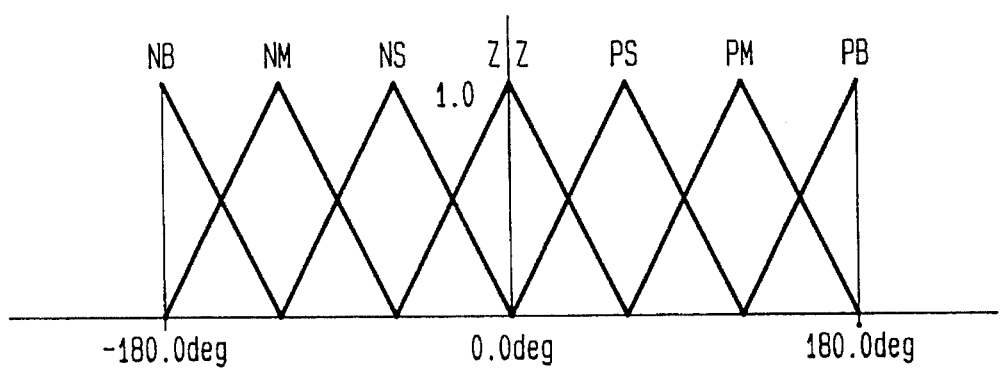
FIG. 7 is a diagram showing the membership functions of the angular deviation A of the autonomous mobile machine from the planned path.

The input parameters D and A for the membership functions of FIGS. 6 and 7, have seven fuzzy values: NB (very far left/direction deviated), NW (halfway far left/direction deviated), NS (near left/direction slightly deviated), ZZ (substantially zero/no substantial directional deviation), PS (near right/direction slightly deviated), PW (halfway far right/direction deviated) and PB (very far right/direction deviated). For example when a signal indicative of D being 15.0 cm is entered, the navigator 12 computes the appropriateness of the input's fuzzy value for the membership functions of FIG. 6, and gives appropriateness values of 0.5 for PS and PW, respectively. The appropriateness of other fuzzy values is zero. Note that computation of the appropriateness may be speeded up by table search, as is generally done in fuzzy computation.

Figure 8:
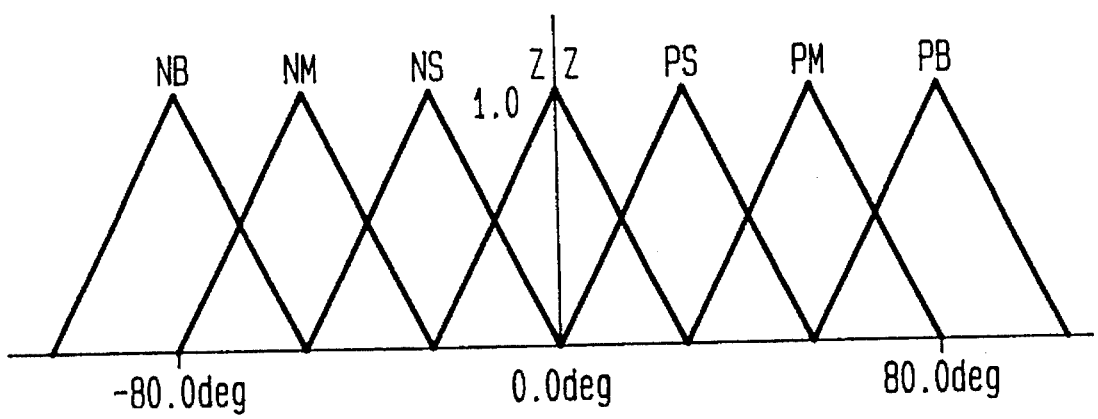
FIG. 8 is a diagram showing the membership functions of the steering angle S for the autonomous mobile machine.
Figure 9:
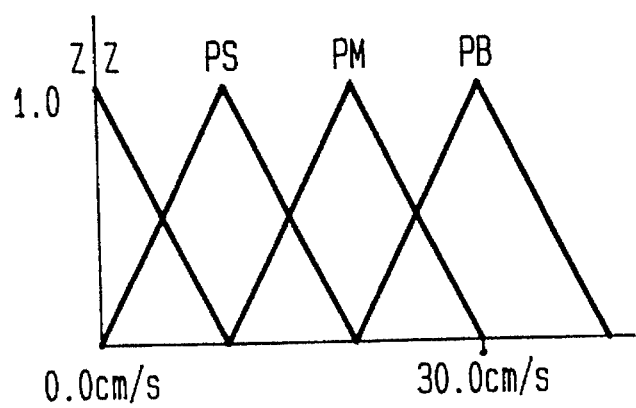
FIG. 9 is a diagram showing the membership functions of the speed instruction V for the autonomous mobile machine.

Among the output parameters, the steering angle S, according to the membership functions of FIG. 8, has seven fuzzy values-NB (steer greatly left), NW (steer halfway left), NS (steer slightly left), ZZ (almost no steering), PS (steer slightly right), PW (steer halfway right), and PB (steer greatly left); whilst the speed V, according to the membership functions of FIG. 9, has four fuzzy values-PB (fast), PW (medium fast), PS (slow), and ZZ (stop).

The rules established here are as shown in FIG. 10, in which 49 each are defined for the speed and steering instructions. They output steering instructions that reduce the speed and orient the robot back onto the path when it goes astray. For example, in FIG. 4, if the inputs D and A are appropriate for the fuzzy values of PB (very far right) and PM (halfway deviated right) and the degrees of their appropriateness are 0.7 and 0.3, the outputs V and S will be PS (slow) and NB (steer greatly left). A value 0.3, for example, may be given as the appropriateness of these rules. By effecting fuzzy inference in this manner for each of the output parameters, membership functions are weighted by degrees of the appropriateness of rules. After the maximum composition, and the value of the gravity center is obtained by a centralizing method as an output value. The centralizing method is a representative method for obtaining a non-fuzzy value.

B. Fuzzy Control for Avoiding Collisions with Obstacles

Figure 11:
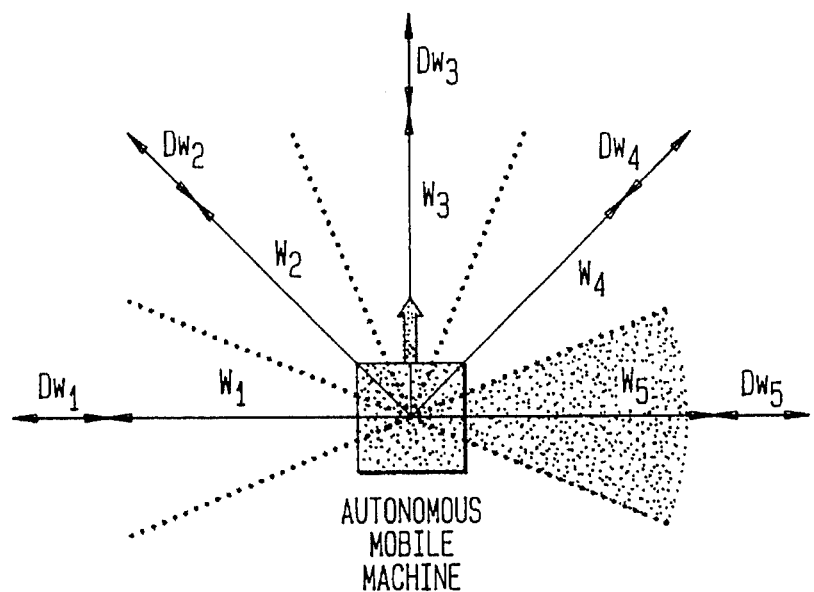
FIG. 11 is a diagram showing the inputs for obstacle avoidance navigation.

The input parameters of fuzzy control for avoiding collision with obstacles are, as shown in FIG. 11, the distances (W1 to W5) of the free space in five directions: left, right, half left, half right, front; the changes between sampling times (Dw1 to Dw5) in the distances of the free space in five directions: left, right, half left, half right, and front; STATE, indicating whether the mobile robot is moving on the path, going to go off the path, or going to return to the path; and SIDE, indicating the location of the mobile robot: on the path, right of the path, or left of the path. For specific sensing of the free space distances W1 to W5, an active range sensor (an ultrasonic sonar, PSD-type infrared distance sensor, or the like) is used. That is, the distances are measured by range sensors on a circumference in the five directions of the mobile robot defined by FIG. 11 STATE and SIDE are obtained from the decision table of FIG. 12 by using the distance D and the displacement angle A from the path. A negative value (−1) of STATE indicates that the robot is approaching the path, zero that it is on the path, and a positive value (1) that it is moving away from the path. A negative value (−1) of SIDE indicates that the robot is to the left of the path, zero that it is on the path, and a positive value (1) that it is to the right. STATE is a signal indicating the dynamic degree of tracing of the path, whilst SIDE is a signal indicating the stationary degree of tracing of the path. The control outputs are the speed of motion V of the robot and the steering angle S, as in the path-tracing movement.

Figure 13:
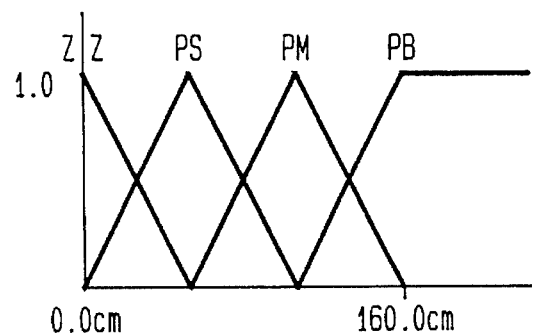
FIG. 13 is a diagram showing the membership functions of the free space distances $W_n$.
Figure 14:
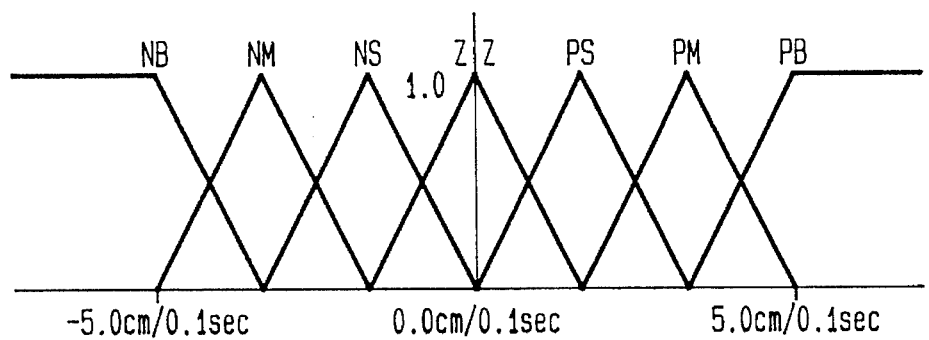
FIG. 14 is a diagram showing the membership functions of the time sequence changes $D_{wn}$ of the free space distances $W_n$.
Figure 15:
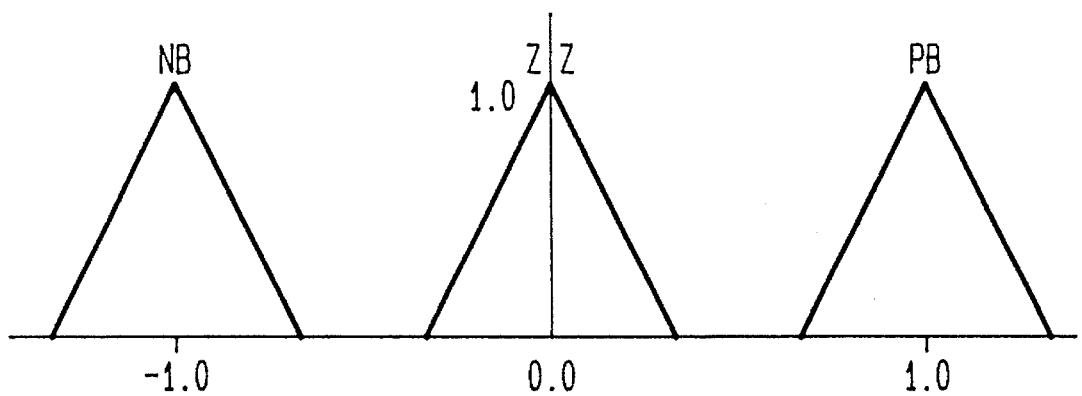
FIG. 15 is a diagram showing the membership functions of the parameters STATE and SIDE.

The input parameters for free space distances have four fuzzy values of ZZ (substantially in contact), PS (very near), PM (fairly near), and PB (far), for the membership functions of FIG. 13, and, the parameters for time sequence changes have seven fuzzy values of NB (negative large change), NM (negative medium change), NS (negative slight change), ZZ (no substantial change), PS (positive slight change), PM (positive medium change), and PB (positive large change). Assume here that STATE and SIDE each have the fuzzy values NV (negative value), ZZ (zero), and PB (positive value) for the membership functions defined by FIG. 15. The control outputs have the same output parameters (speed of motion V and steering angle S of the vehicle) and have the same fuzzy values as those in the navigation procedure for path tracing.

To avoid collision with an obstacle, it is necessary to determine in which direction the robot should advance from information on the free space distances Wn (n=1 to 5) and the changes in these distances Dwn (n=1 to 5) between sampling times, and to give adequate instructions to the driving system. The robot advances in a direction that has a large free space distance Wn, according to the basic policy for collision avoidance, because a direction that has a large free space distance Wn is considered safe. However, when Wn decreases gradually, that is, when the change Dwn in the distance between sampling times is negative, the direction is not always safe. In addition, the free space distances Wn have different risks of collision. For example, if the path is set to extend along a wall, the left or right free space distance W1 or W5) is small when the robot traces the path. In this case, however, the risk of collision with an obstacle is not necessarily large. It is therefore necessary to give the drive system adequate instructions in accordance with various situations depending on the environment and methods of movement.

The invention has 155 fuzzy rules, shown in FIGS. 16 to 18, for moving while avoiding collisions in the interior path environment shown in FIG. 4, for each of the control outputs V and S. In the manner described in the last paragraph, fuzzy inference is made for each of the output parameters V and S, membership functions weighted by degrees of appropriateness of respective rules are obtained, and, after maximum composition, the values of the center position are obtained as output values of the output parameters by the centralizing method.

An existing rule base describes the procedures for various situations of the mobile robot in a supposed environment, and may be regarded as knowledge on navigation control of the mobile robot. When the mobile robot meets a certain situation, a corresponding set of obstacle collision avoidance rules fires in the process of fuzzy inference and allows the robot to avoid collision with an obstacle. For example, if a stationary obstacle exists ahead of the mobile robot while it moves along a path with a wall on the left, the free space distance W3 in front of the mobile robot with respect to the moving direction gradually decreases, that is, Dw3 comes to have a negative value. If a free space exists to the right of the mobile robot facing in the direction of motion, rules 106 to 129 are appropriate for this case. The instructions PM (medium fast) for V (speed) and PM (steer medium right) or PS (steer slight right) for S (steering angle) are generated.

The fuzzy rule base for obstacle avoidance includes the following rules:

(i) Rules (003 to 011) for outputting fuzzy values in which the steering angle and speed are zero, in response to fuzzy values of all the free space distances W1 to W5 being small.

(ii) Rules (for example, 018 to 020) for outputting a large fuzzy value for steering angle and a small fuzzy value for speed, in response to the fuzzy value of the free space distance W3 being small.

(iii) Rules (012 to 057 and 074 to 129) for outputting fuzzy values for driving the machine into a divisional space in which the distance to an obstacle is large with respect to the steering angle, in response to the free space distances W1 to W5 having a large fuzzy value and a small fuzzy value.

C. Combination of Path Tracing Navigation and Obstacle Avoidance Navigation in accordance with situations The two fuzzy controls described above are executed independently. For actual navigation, however, they must be adequately combined as the situation requires. For example, if the mobile robot traces the predetermined path even though an obstacle exists ahead of it, collision is not avoided. Further, even if control output values for avoiding an obstacle are generated by the navigation procedure for obstacle avoidance, if they are combined with equally-weighted control output values generated by the navigation procedure for path tracing, the following problems occur: First, it is possible that the robot hits an edge of the obstacle and cannot fully avoid it. Next, if the path is set along a wall, the robot moves off the predetermined path as a result of combination of the control outputs for obstacle avoidance to avoid the wall and the control outputs for path tracing.

In order to remove these defects, the invention determines a weighting coefficient (1.0–K) for path tracing and a weighting coefficient K for obstacle avoidance by using information from a sensor, and distributes the weighting by multiplying the respective control outputs by the weighting coefficients. More specifically, when the instructed speed V and the instructed steering angle S obtained by path tracing control are denoted by Vt and St, respectively, and V and S obtained by obstacle avoidance control are denoted by Va and Sa, the final values of V and S are:

$$V = Vt(1.0-K) + Va\,K$$
$$S = St(1.0-K) + Sa\,K \quad (1)$$

where $$0.0 <= K <= 1.0$$

The control selection coefficient K is obtained from the same parameters (W1 to W5, Dw1 to Dw5, STATE, and SIDE) as those of the preceding paragraph by executing fuzzy inference. Its rule base has the same antecedent section as that of the fuzzy rules for avoiding collisions with obstacles (FIGS. 16 to 18). This makes it possible for navigation for obstacle avoidance to be added to path tracing when the rules for obstacle avoidance fire. When none of the rules for avoiding collision with an obstacle fires, that is, when none of the rules for determining the control selection coefficient K fires, the system determines that there is no possibility of collision, and outputs 0.0 as a specific value of K to perform only path tracing navigation.

Figure 19:
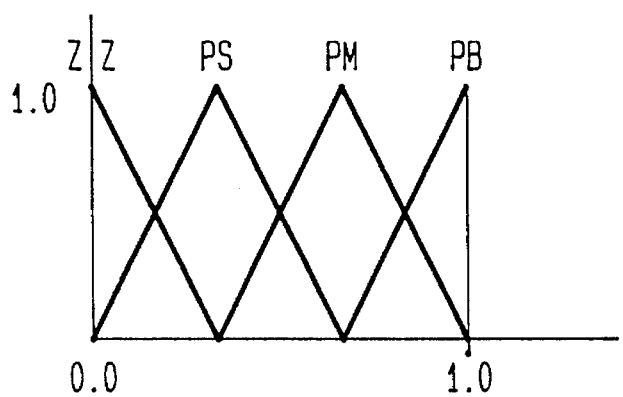
FIG. 19 is a diagram showing the membership functions of the weighting coefficients K.

The output parameter (control selection coefficient K) has four fuzzy values: ZZ (tracing control alone), PS (tracing control significantly weighted), PS (obstacle avoidance control significantly weighted), and PB (obstacle avoidance control alone) (FIG. 19). The system executes fuzzy inference by using the rules in FIGS. 16 to 18, obtains membership functions weighted by degrees of appropriateness of these rules, and, after maximum composition, obtains the value of the center position as an output value of K by the centralizing method.

The fuzzy rule base for deciding the control selective coefficient includes the following rules:

(i) Rules (003 to 011) for outputting a large fuzzy value for K, in response to the fuzzy values of all the free space distances W1 to W5 being small.

(ii) Rules (for example, 018 to 020) for outputting a large fuzzy value for K, in response to the fuzzy value of the free space distance W3 being small.

(iii) Rules (for example, 012 to 014) for outputting a small fuzzy value for K, in response to the fuzzy value of the free space distance W3 being large.

(iv) Rules (058 to 073) for outputting a zero fuzzy value for K, in response to the fuzzy values of the changes Dw1 to Dw5 in the free space distances between sampling times being zero and the fuzzy value of the degree of dynamic path tracing, STATE, being zero.

(v) Rules (074 to 081, 098 to 105, and 122 to 129) for outputting an intermediate fuzzy value for K, in response to the fuzzy value of the free space distance W3 being large but at least one of the fuzzy values of the other free space distances being small.

(vi) Rules (082 to 093 and 106 to 117) for outputting an intermediate fuzzy value for K, in response to the fuzzy value of the free space distance W3 being large but the fuzzy value of its change Dw3 being negative.

(vii) Rules (094 to 097 and 118 to 121) for outputting an intermediate fuzzy value for K, in response to an intermediate situation between (v) and (vi).

(viii) Rules (130 to 155) for outputting a large fuzzy value for K, in response to the fuzzy value of the free space distance W1 (and W2) being zero and the fuzzy value of the stationary degree of path tracing, SIDE, being large, or alternatively, the fuzzy value of the free space distance W5 (and W4) being zero and the fuzzy value of SIDE being large.

D. Simulation Experiments

Figure 20:
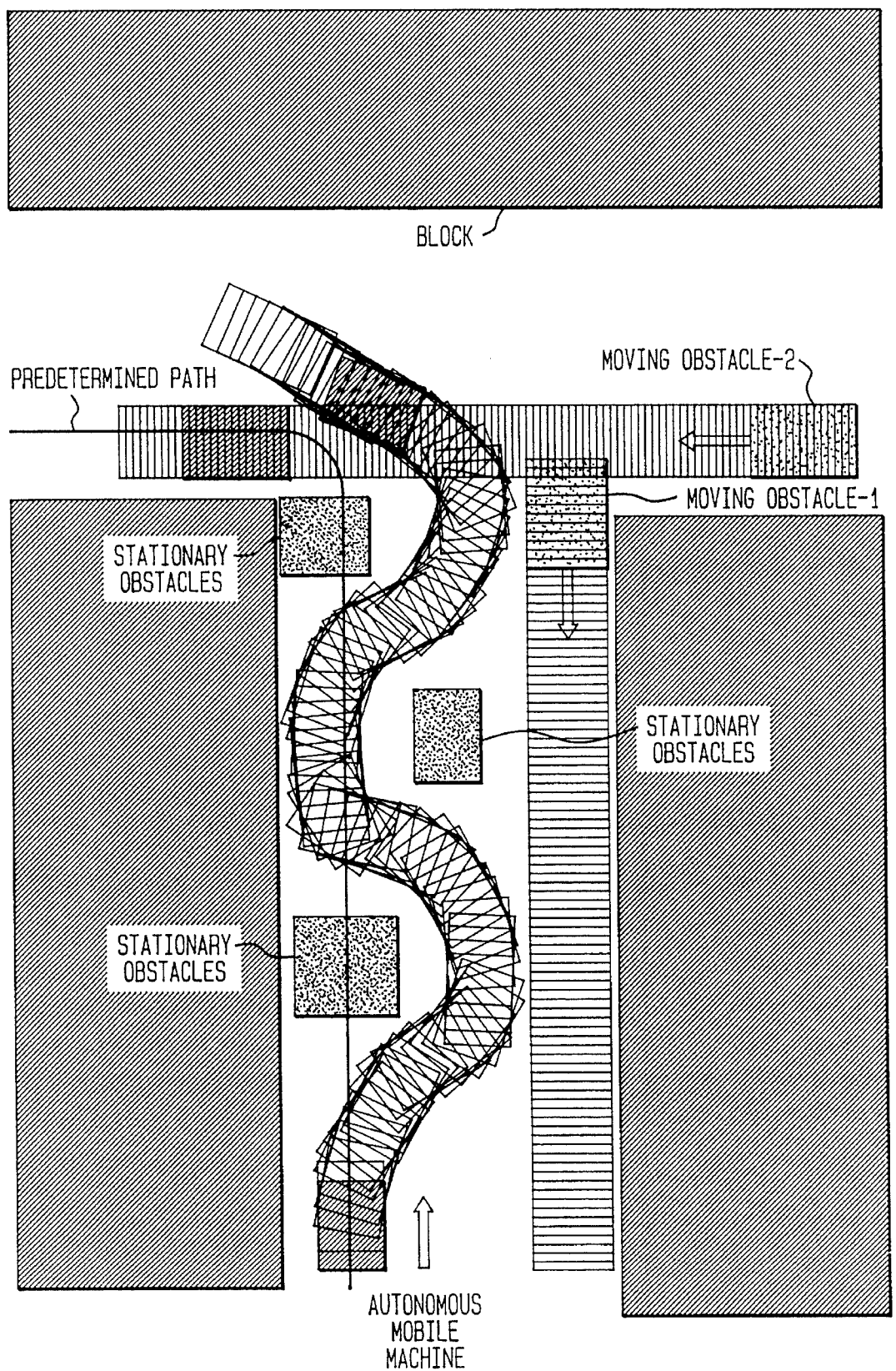
FIG. 20 is a diagram showing the results of a simulation experiment.

FIG. 20 shows the result of a simulation in an environment containing obstacles. The sampling interval of control is set to 0.1 sec. The results show the trajectories every 1 sec. The speed of the autonomous mobile machine (a mobile robot is employed here) is variable, but its target speed is 30 cm/s.

In the example shown in FIG. 20, a plurality of stationary obstacles form a crank course. The robot avoided the obstacles according to the rules (030 to 057) for moving along a narrow crank course, and returned to the planned path.

In the example shown in FIG. 20, the speed of the moving obstacle-2 is set so that the mobile robot comes across it at the exit of the passage containing stationary obstacles. The moving obstacles here are assumed to be persons or running vehicles, and are represented by rectangles. The speed of the moving obstacle-2 in this simulation is set to be slower than that of the mobile robot. Therefore, the robot will outrun the moving obstacle according to rules (012 to 029) for advancing while looking for a free space.

E. Variations

The foregoing description has been based on a specific embodiment. The invention, however, is not limited to this embodiment. Some possible variations are shown below.

The embodiment has been explained as being an autonomous mobile machine having a built-in navigator. Note, however, that the control procedure shown in FIG. 1 is also applicable to an arrangement in which a navigator is provided in the exterior of the mobile machine. In this case, an output from the sensing unit of the mobile machine is transmitted to the exterior navigator by, for example, wireless transmission, and instructions from the navigator are transmitted to the drive system of the mobile machine.

It is also possible to install the sensing unit for obtaining the distance and angle from the path in the exterior of the mobile machine. For example, a camera for monitoring a machine that moves indoors may be set up so as to analyze picture signals and obtain input parameters such as D, A, Wn, and Dwn.

It is also possible for the sensing unit to compute the degrees of appropriateness of the input parameters for fuzzy values and send the results of the computation to the navigator.

Alternatively, the sensing unit may be designed to measure only the absolute position/direction of the mobile machine so that the navigator computes information D and A on the distance and angle from the path. In this case, information on the predetermined path is given to the navigator beforehand.

The following explanation concerns fuzzy rules for obstacle avoidance and for determination of the control selective coefficients shown in FIGS. 16 to 18. Some rules have high generality, and some rules are given on the assumption that the path follows a wall, as shown in FIG. 4. If the invention is applied to a different environment, particularly effective rules for the environment may be added, or unnecessary rules may be deleted.

The fuzzy rule base shown in FIGS. 16 to 18 for obstacle avoidance and for determination of control selective coefficients employs STATE and SIDE as input parameters; however, since they are obtained from D and A by using the decision table, a rule base equivalent to the above-mentioned fuzzy rule base may be constructed by using D and A. However, employment of the input parameters STATE and SIDE is preferable from the viewpoint of easy description.

The embodiment unites the rule base for obstacle avoidance and the rule base for determination of control selective coefficients into one; however, they may be separated again. The antecedent parts of rules for obstacle avoidance and the antecedent parts of rules for determination of control selective coefficients may be different. For example, rules for obstacle avoidance can be described without using an input parameter indicating the distance and angle from the path.

In the embodiment, the weighting coefficient for path-tracing navigation is automatically obtained at the same time as the weighting coefficient for obstacle avoidance navigation. However, it is also possible to construct separate rule bases for obtaining these weighting coefficients.

The embodiment uses dead reckoning by wheel rotation in order to measure the absolute position/direction of the mobile machine. However, a method of receiving radio waves from a plurality of artificial satellites and measuring the position relative to the earth may be employed. This method is convenient for a mobile machine without wheels.

The embodiment uses Equation (1) to compute the final values of the control outputs; however, there are other ways of combining the intermediate control outputs and weighting coefficients.

I claim:

1. An autonomous mobile machine comprising:
   (a) a sensing unit for outputting signals related to a distance and an angle between the machine and a path to be traced the sensing unit further outputting signals related to an obstacle-free space, the obstacle-free space being the space in which the machine can move freely between a first and second sampling time;
   (b) means for obtaining intermediate control outputs by using a navigation procedure for path tracing in accordance with signals related to the distance and angle;
   (c) means for obtaining intermediate control outputs by using a navigation procedure for obstacle avoidance in accordance with signals related to the obstacle-free space;
   (d) means for determining a first weighting coefficient for path tracing and a second weighting coefficient for obstacle avoidance by inference based on a set of fuzzy rules in accordance with the signals related to the distance and angle and the signals related the obstacle-free space;
   (e) means for computing a set of computed control outputs from the intermediate outputs obtained by said means (c), those obtained by the means (d), a first coefficient, and a second coefficient; and
   (f) a drive system for driving the machine in accordance with the set of computed control outputs.

2. The autonomous mobile machine according to claim 1 wherein the means (c) performs inference by using an obstacle set of fuzzy rules, the obstacle set being a subset of the set of fuzzy rules that are related to obstacle avoidance.

3. The autonomous mobile machine according to claim 2 wherein the set of fuzzy rules for determining the weighting coefficients and the obstacle set of fuzzy rules for obstacle avoidance have a one-to-one correspondence, and wherein corresponding rules have the same condition.

4. The autonomous mobile machine according to claim 1 wherein the signals related to obstacle-free space consist of a signal indicating the distance from the machine to the obstacle in each of a plurality of spaces called divisional spaces determined by dividing the space ahead of the current position of the machine into one or more spaces, and a signal indicating change in a free space distance for each divisional space, the free space distance being the distance between the machine and the object in each respective divisional space between sampling times.

5. The autonomous mobile machine according to claim 1 wherein the fuzzy values of the second weighting coefficient are described in the set of fuzzy rules.

6. The autonomous mobile machine according to claim 5 wherein the set of fuzzy rules includes rules that output a large fuzzy value for the second weighing coefficient in response to a distance fuzzy value of the free space distance to the obstacle being small in all of the divisional spaces.

7. The autonomous mobile machine according to claim 5 wherein said set of fuzzy rules includes rules that output a large fuzzy value for the second weighing coefficient in response to a fuzzy rule value of the free space distance to an obstacle being small in one of a plurality of divisional spaces located ahead of the machine with respect to the machine's current direction of motion called a front space.

8. The autonomous mobile machine according to claim 5 wherein the set of fuzzy rules includes rules that output a small fuzzy value for the second weighting coefficient in response to a distance fuzzy value of the free space distance to an obstacle being large in a front space.

9. The autonomous mobile machine according to claim 5 wherein the set of rules includes rules that output a zero fuzzy value for the second coefficient in response to a distance change fuzzy value of the change in the distance to the obstacle between sampling times being zero and a fuzzy value indicating that the distance and angle from the path being zero in all of a plurality of divisional spaces.

10. The autonomous mobile machine according to claim 5 wherein the set of fuzzy rules includes rules that output a medium fuzzy value for the second weighting coefficient in response to a distance fuzzy value of the divisional distance to the obstacle being large in a front space but small in at least one of a plurality of remaining divisional spaces.

11. The autonomous mobile machine according to claim 5 wherein the set of fuzzy rules includes rules that output a medium fuzzy value for the second weighting coefficient in response to a distance fuzzy value of the divisional distance to the obstacle being large in a front space but a distance change fuzzy value of the change in this distance between sampling times being negative.

12. The autonomous mobile machine according to claim 5 wherein the set of fuzzy rules includes rules that output a large fuzzy value for the second weighting coefficient in response to a distance fuzzy value of the distance to the obstacle located to one side of the machine's current direction of motion being zero and a fuzzy value indicating that the distance and angle from the path is large.

13. The autonomous mobile machine according to claim 1 including means for generating a STATE and a SIDE signal the SIDE signal indicating the stationary degree of the machine's path tracing and the STATE signal indicating the dynamic degree of the machine's path tracing.

14. The autonomous mobile machine according to claim 9 wherein a fuzzy value indicating the distance and angle from the path as a fuzzy value of a dynamic degree of path tracing.

15. The autonomous mobile machine according to claim 12 wherein a fuzzy value of the distance and angle from the path is a fuzzy value of a stationary degree of path tracing.

16. A control apparatus for navigating a mobile machine comprising:

means for obtaining intermediate control outputs in accordance with signals related to a distance and an angle between the machine and a path to be traced according to a navigation procedure for path tracing;

means for obtaining intermediate control outputs in accordance with signals related to an obstacle-free space according to the navigation procedure for obstacle avoidance;

means for determining a first weighting coefficient for path tracing and a second weighting coefficient for obstacle avoidance by inference based on a set of fuzzy rules in response to the signals related to distance and angle and the signals related to obstacle-free space; and means for computing control outputs from a set of intermediate outputs obtained by the navigation procedure for path tracing, those obtained by the navigation procedure for obstacle avoidance, the first coefficient, and the second coefficient.

17. A control method for navigating a mobile machine comprising the steps of:

obtaining intermediate control outputs in accordance with information related to a distance and one or more angles between the machine and a path to be traced according to a navigation procedure for path tracing;

obtaining intermediate control outputs in accordance with information related to an obstacle-free space according to the navigation procedure for obstacle avoidance;

determining a first weighting coefficient for path tracing and a second weighting coefficient for obstacle avoidance in accordance with said information related to the distance and angle and said information related to the obstacle-free space; and computing control outputs in accordance with the intermediate outputs obtained by said navigation procedure for path tracing, the first weighting coefficient, the intermediate outputs obtained by said navigation procedure for obstacle avoidance, and the second weighting coefficient.

18. A control system comprising:

a sensing unit for outputting different kinds of signals indicating one or more control parameters for calculating the weighting coefficients;

means for generating intermediate control outputs according to a first control procedure in accordance with at least one kind of signal;

means for generating intermediate control outputs according to a second control procedure in accordance with at least one other kind of signal;

means for generating a first weighting coefficient for the first control procedure and a second weighting coefficient for the second control procedure by fuzzy inference in accordance with the kinds of signals used in the first and second control procedures; and means for computing control outputs in accordance with the intermediate outputs obtained by first control procedure, the first weighting coefficient, the intermediate outputs obtained by second control procedure, and the second weighting coefficient.

19. The autonomous mobile machine according to claim 4 wherein the fuzzy values of the second weighting coefficient are described in the set of fuzzy rules.

* * * * *